(12) United States Patent
Koch et al.

(10) Patent No.: US 9,688,379 B2
(45) Date of Patent: Jun. 27, 2017

(54) ACTUATION DEVICE FOR OPENING AN EMERGENCY EXIT FLAP OF A COCKPIT DOOR

(71) Applicant: AIRBUS OPERATIONS GMBH, Hamburg (DE)

(72) Inventors: Maik Koch, Lilienthal (DE); Matthias Breuer, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 946 days.

(21) Appl. No.: 13/630,287

(22) Filed: Sep. 28, 2012

(65) Prior Publication Data

US 2013/0082141 A1 Apr. 4, 2013

Related U.S. Application Data

(60) Provisional application No. 61/541,628, filed on Sep. 30, 2011.

(30) Foreign Application Priority Data

Sep. 30, 2011 (DE) .................. 10 2011 114 643

(51) Int. Cl.
*B64C 1/14* (2006.01)
*B64C 1/32* (2006.01)
*B64C 1/18* (2006.01)

(52) U.S. Cl.
CPC ............ *B64C 1/1469* (2013.01); *B64C 1/14* (2013.01); *B64C 1/18* (2013.01); *B64C 1/32* (2013.01)

(58) Field of Classification Search
CPC B64C 1/18; B64C 1/1469; B64C 1/14; B64C 1/1407; B64C 1/32; B64D 45/0015
(Continued)

(56) References Cited

U.S. PATENT DOCUMENTS 1,094,677 A * 4/1914 Page ................... E05B 65/1006
292/21
1,529,865 A * 3/1925 Bolles ................. E05B 65/1006
292/21
(Continued)

FOREIGN PATENT DOCUMENTS

CA 2322568 A1 4/2001
DE 102007040572 B3 1/2009
DE 102009004811 A1 7/2010

OTHER PUBLICATIONS

German Patent Office, German Office Action dated Dec. 22, 2011 for German Patent Application No. 10 2011 114 643.5.

*Primary Examiner* — Philip J Bonzell
*Assistant Examiner* — Steven Hawk
(74) *Attorney, Agent, or Firm* — Lorenz & Kopf, LLC

(57) ABSTRACT

An actuation device for opening an emergency exit flap of a cockpit door is provided. The actuation device comprises a support structure, at least two securing elements, an actuation element and a deflection mechanism. The support structure is configured so as to be fastened to the emergency exit flap. The securing elements are integrated into the support structure and are configured so as to fasten the actuation device, and thus the emergency exit flap, to the cockpit door. The actuation element is connected to the support structure. Therein, the deflection mechanism connects the securing elements to the actuation element in such a way that a force which is exerted on the actuation element is diverted in such a way that the securing elements are released from the cockpit door.

6 Claims, 5 Drawing Sheets

(58) Field of Classification Search
USPC .................................................. 244/118.5
See application file for complete search history.

(56) References Cited

U.S. PATENT DOCUMENTS

| | | | | |
|---|---|---|---|---|
| 2,797,884 | A * | 7/1957 | Peed, Jr. | B64C 1/1407 114/117 |
| 2,968,506 | A * | 1/1961 | Lade | E05B 63/248 292/21 |
| 4,042,193 | A * | 8/1977 | Cerne | B64C 1/1407 192/144 |
| 4,387,917 | A * | 6/1983 | Cocker | E05B 63/20 292/40 |
| 4,785,741 | A * | 11/1988 | Gronow | B60J 9/02 105/348 |
| 5,769,361 | A * | 6/1998 | Charieras | B64C 1/1476 244/121 |
| 5,826,824 | A * | 10/1998 | Martin | B64C 1/32 244/129.3 |
| 5,931,415 | A * | 8/1999 | Lingard | B64C 1/143 244/129.4 |
| 6,000,733 | A * | 12/1999 | Linder | E05B 65/1046 292/21 |
| 6,109,563 | A * | 8/2000 | Verhoeven | B64C 1/1407 244/129.5 |
| 6,168,114 | B1 * | 1/2001 | Erben | B64C 1/1407 244/129.5 |
| 6,746,060 | B2 * | 6/2004 | O'Brien, II | E05B 65/1046 292/337 |
| 6,820,905 | B1 * | 11/2004 | Haeck | E05B 65/1013 292/223 |
| 6,976,658 | B2 * | 12/2005 | Sekikawa | B64C 1/1469 244/118.5 |
| 7,568,659 | B2 * | 8/2009 | Roques | B64C 1/1407 244/121 |
| 2002/0153731 | A1 * | 10/2002 | O'Brien, II | E05B 65/1053 292/92 |
| 2002/0153732 | A1 * | 10/2002 | O'Brien, II | E05B 65/1046 292/93 |
| 2003/0122036 | A1 * | 7/2003 | Artsiely | B64C 1/1469 244/129.4 |
| 2003/0131639 | A1 * | 7/2003 | Segawa | E05B 37/16 70/92 |
| 2003/0141415 | A1 * | 7/2003 | Leclerc | B64C 1/1407 244/129.5 |
| 2004/0144894 | A1 * | 7/2004 | Paradis | B64C 1/32 244/129.4 |
| 2006/0048449 | A1 * | 3/2006 | Roques | B64C 1/1407 49/62 |
| 2007/0113478 | A1 * | 5/2007 | Chu | E05C 7/02 49/67 |
| 2007/0273158 | A1 * | 11/2007 | Berger | E05B 53/003 292/92 |
| 2008/0012350 | A1 * | 1/2008 | Condo | E05B 65/1053 292/92 |
| 2008/0111025 | A1 * | 5/2008 | Saku | B64C 1/1469 244/129.5 |
| 2008/0164377 | A1 * | 7/2008 | Lautridou | B64C 1/1469 244/229 |
| 2008/0277530 | A1 * | 11/2008 | Kyle | B64C 1/1407 244/129.5 |
| 2009/0194999 | A1 * | 8/2009 | Shen | E05B 63/0056 292/219 |
| 2009/0212578 | A1 * | 8/2009 | Gibbons | E05B 65/0852 292/262 |
| 2010/0123323 | A1 * | 5/2010 | Geringer | E05B 47/0012 292/164 |
| 2010/0193633 | A1 * | 8/2010 | Budinger | B64C 1/18 244/118.5 |
| 2010/0252679 | A1 * | 10/2010 | Sutthoff | B64C 1/1446 244/118.3 |
| 2011/0049299 | A1 * | 3/2011 | Gowing | B64C 1/14 244/129.5 |
| 2011/0067308 | A1 * | 3/2011 | Hunt | E05C 19/166 49/31 |
| 2012/0167644 | A1 * | 7/2012 | Berger | E05B 43/005 70/144 |
| 2012/0205491 | A1 * | 8/2012 | Rittner | A62B 7/14 244/118.5 |
| 2013/0076046 | A1 * | 3/2013 | Shah | E05B 63/0056 292/336.3 |
| 2013/0269258 | A1 * | 10/2013 | Koch | B64C 1/1469 49/67 |
| 2014/0132009 | A1 * | 5/2014 | Chiang | E05C 3/124 292/156 |
| 2014/0209605 | A1 * | 7/2014 | Spahmann | B65F 1/163 220/264 |
| 2014/0345087 | A1 * | 11/2014 | Simon | E05B 1/0069 16/412 |
| 2015/0059988 | A1 * | 3/2015 | Apdalhaliem | B64C 1/1423 160/6 |
| 2015/0210373 | A1 * | 7/2015 | Guimont | B64C 1/1469 244/129.5 |
| 2015/0211253 | A1 * | 7/2015 | Shah | E05B 7/00 292/336.3 |
| 2015/0329194 | A1 * | 11/2015 | Joern | B64C 1/1423 244/129.5 |
| 2015/0375845 | A1 * | 12/2015 | Salgues | B64C 1/1407 244/129.5 |
| 2015/0375866 | A1 * | 12/2015 | Salgues | B64D 13/04 244/129.5 |
| 2016/0236765 | A1 * | 8/2016 | Auriac | B64C 1/1423 |

* cited by examiner

ACTUATION DEVICE FOR OPENING AN EMERGENCY EXIT FLAP OF A COCKPIT DOOR

CROSS-REFERENCE TO RELATED APPLICATIONS

This application claims priority to German Patent Application No. 10 2011 114 643.5, filed Sep. 30, 2011 and to U.S. Provisional Patent Application No. 61/541,628, filed Sep. 30, 2011, which are incorporated herein by reference in their entirety.

TECHNICAL FIELD

The technical field relates to an actuation device for opening an emergency exit flap of a cockpit door, to a corresponding emergency exit flap, to a cockpit door comprising a corresponding emergency exit flap, and to an aircraft comprising a corresponding cockpit door.

BACKGROUND

In means of passenger transport, such as for example in passenger aircraft, a cockpit region is generally separated from a passenger region by a door. Therein, particular safety measures and counter-terrorism regulations have to be implemented so as to protect the cockpit crew. For example, undesired intrusion into the cockpit region from the cabin region has to be prevented. Further, the door to the cockpit region may be made bulletproof. Similar measures are known from US 2008 164 377 A1 and FR 291 114 A1. On the other hand, the possibility of evacuating the cockpit crew must be provided for example if the door jams. For this purpose, an emergency exit flap which makes it possible to exit the cockpit towards the cabin may be arranged in the door. The emergency exit flap is fixed on the cockpit side so as to prevent the emergency exit flap from being opened from the cabin side. The fixation may for example be realised by pins. To open the emergency exit flap, the pins generally have to be removed by pulling on a wire ring from the cockpit side. Other objects, desirable features and characteristics will become apparent from the subsequent summary and detailed description, and the appended claims, taken in conjunction with the accompanying drawings and this background.

SUMMARY

According to various aspects of the present disclosure, provided is an actuation device for opening an emergency exit flap of a cockpit door, said device being robust on the one hand, and making it simpler and safer to open the emergency exit flap on the other hand. In the following, features, details and potential advantages of a device in accordance with exemplary embodiments of the present disclosure will be discussed in detail.

In accordance with one of various aspects of the present disclosure, an actuation device for opening an emergency exit flap of a cockpit door is presented. The actuation device comprises a support structure, at least two securing elements, an actuation element and a deflection mechanism. Therein, the support structure is fastenable to the emergency exit flap. The securing elements are integrated into the support structure and are configured so as to fasten the actuation device to the cockpit door. The actuation element is connected to the support structure. Further, the deflection mechanism connects the securing elements to the actuation element in such a way that a force which is exerted on the actuation element is diverted in such a way that the securing elements are released from the cockpit door.

In other words, the idea of the present disclosure is based on providing an actuation device which makes it easier to open the emergency exit flap by mechanically deflecting forces. The actuation device is fastened to the emergency exit flap on the cockpit side by a support structure, and is fixed to the cockpit door on the cockpit side by securing elements such as pins. In this way, under normal conditions unauthorised entry to the cockpit is prevented. In an emergency, the securing elements may be released or freed from the cockpit door in such a way that the emergency exit flap may be pushed into the cabin optionally together with the actuation device. The securing elements are released by the exertion of a force on the actuation surface of the actuation element and the diversion of the force, which acts on the actuation surface, towards the securing elements by a deflection mechanism.

The actuation device according to the various teachings of the present disclosure makes it possible to open the emergency exit flap simply and rapidly, for example by a kick. For this purpose, the actuation element and for example, the actuation surface, may be dimensioned accordingly and arranged for example at a corresponding ceiling height. Therein, the emergency exit flap is formed in such a way that it is reachable in the most optimised ergonomic manner possible. As a result of the deflection mechanism, the force which is applied to the actuation surface is deflected in such a way that different flexible variants of the arrangement and configuration of the actuation surface are possible.

The actuation device makes it possible to open the emergency exit flap by way of a foot kick. This is advantageous in that a person may apply force more strongly and more comfortably by way of a kick than by way of manual actuation. Thus, as a result of the deflection mechanism, a greater exertion of force is possible than by pulling on rings in the pins for example.

The actuation surface may act together with the deflection mechanism as a lever, in such a way that less exertion of force is necessary or a more efficient use of force is possible. By the actuation device according to the present disclosure, it may be possible, for example merely by way of a kick, not only to unlock the emergency exit flap, but also to remove it from the cockpit door or open it towards the cabin. If further retaining elements, such as hook-and-loop tape, are provided on the emergency exit flap, they may be released by way of the same kick. Overall, the actuation device makes safe, simple and intuitive operation possible.

The actuation device may be designed retrofittable. That is to say, the actuation device may be dimensioned and configured in such a way that it may be used with pre-existing emergency exit flaps and cockpit doors. For example, the support structure may be designed in such a way that it corresponds to pre-existing receiving and engaging elements on the emergency exit flap. Further, the securing elements may be dimensioned and spaced apart from one another in such a way that they correspond to pre-existing receiving or engaging elements on the cockpit door.

The actuation device may also be referred to as a "kick release mechanism," and comprises a support structure. The support structure may be fastened directly to the emergency exit flap, for example, so called inserts. The fastening between the support structure and the emergency exit flap may be made reversible, that is to say releasable by a tool, or irreversible, that is to say permanent, for example by gluing.

Securing elements, such as, for example, pins are integrated into the support structure. The securing elements fix the actuation device to the cockpit door. That is to say, as long as the securing elements engage with corresponding receiving elements on the cockpit door, the emergency exit flap cannot be opened neither from the cabin side nor from the cockpit side. If the securing elements are released or unlocked, the emergency exit flap may be pushed into the cabin from the cockpit side.

The actuation surface may be connected to the support structure via a joint or via a shaft for example. The actuation element and for example, the actuation surface may, for example, be in the form of a kicking surface which comprises a robust material such as metal and/or plastics material. The shape and dimension of the kicking surface may be variable. Therein, the kicking surface in the form of a plane or a three-dimensional structure may, for example, be provided with a three-dimensional footprint symbol. Further, the kicking surface may comprise two planar regions which are joined together at an angle. Force may be exerted on the actuation surface by kicking, pushing or hitting for example.

The deflection mechanism functionally connects the securing elements to the actuation element. That is to say, the deflection mechanism may deflect a force which is applied to the actuation surface in such a way that the securing elements are released from the fixings thereof to the cockpit door. Therein, the deflection mechanism may be integrated into both the support structure and the actuation element. The deflection mechanism may, for example, comprise a mechanical connection, such as a rope or wire between the securing elements, and the actuation element. Further, the deflection mechanism may comprise connecting rods which are interconnected by way of a joint or a shaft and only have one or two degrees of freedom as a result of the arrangement thereof. The force which is exerted on the actuation surface is converted into a movement of the connecting rods in accordance with the degrees of freedom. As a result of this movement, a mechanical connection may be actuated, which pulls or releases the securing elements from the fixings thereof to the cockpit door. For example, one end of a wire rope may be fastened to the securing elements and the other end thereof may be fastened to the connecting rods. When the connecting rods move, or the joint between the connecting rods moves, in a predetermined direction, the wire rope is also pulled in this direction and the securing elements are released.

In accordance with one exemplary embodiment of the present disclosure, an actuation surface of the actuation element is at an acute angle to an emergency exit flap surface when the support structure is fastened to the emergency exit flap.

In other words, the actuation surface may project into the cockpit space in a V shape or be at an angle to the vertical. Therein, the emergency exit flap comprises a surface which is, for example, parallel to the surface of the cockpit door. The actuation surface is at an angle of for example between about 5° and about 80° to the surface of the emergency exit flap. Part of the deflection mechanism may be arranged in the space between the emergency exit flap surface and the actuation surface. Further, as a result of the inclined positioning of the actuation surface, the actuation direction may be recognised intuitively by a user.

In accordance with another exemplary embodiment of the present disclosure, the actuation element is connected to the support structure in such a way that the angle changes when the force is exerted on the actuation surface, and the deflection mechanism is actuated as a result.

For example, when a force is exerted, the angle between the emergency exit flap surface and the actuation surface becomes smaller, for example until the actuation surface is arranged parallel to the emergency exit flap. Therein, the force may, for example, be applied perpendicular to the emergency exit flap surface or parallel to the cockpit floor. The reduction in the angle brings about a movement of the deflection mechanism in such a way that as soon as the angle becomes less than a predetermined angle, the securing elements are released or unlocked from the cockpit door.

In accordance with another exemplary embodiment of the present disclosure, the actuation element is in the form of a beam which may be actuated by exerting a force parallel to the emergency exit flap.

In other words, the actuation surface is arranged approximately at a 90° angle to the emergency exit flap surface and may be pushed downwards or actuated by way of a step. In this embodiment, the angle between the emergency exit flap surface and the actuation surface does not change. The actuation surface is displaced perpendicular to the emergency exit flap surface in relation to the support structure or in relation to the deflection mechanism.

In accordance with another exemplary embodiment of the present disclosure, the deflection mechanism comprises a joint element such as a shaft or a joint. The deflection mechanism further comprises a first connecting rod and a second connecting rod, each comprising a first and a second end. The first end of the first connecting rod is connectable or fixable to the emergency exit flap. The second end of the second connecting rod is connected to the actuation element or to the actuation surface. Further, the second end of the first connecting rod and the first end of the second connecting rod are connected by the joint element so as to be rotatable with respect to one another. Therein, the force which is exerted on the actuation surface is converted into a rotational movement of the connecting rods about the joint element. This rotational movement leads optionally via a displacement element, which is described in the following, to the securing elements being released from the cockpit door.

In accordance with a further exemplary embodiment of the present disclosure, the deflection mechanism comprises a displacement element which connects the securing elements to the actuation surface. The displacement element pulls the securing elements into the support structure when a force is exerted on the actuation surface.

The displacement element may, for example, be in the form of a rope or wire. Therein, the displacement element may be connected to the actuation surface indirectly via the joint element and the connecting rods for example. If, as a result of the exertion of force on the actuation surface, the connecting rods are, for example, e rotated about the joint or moved towards one another in such a way that the joint element changes its position, a force is exerted on the displacement element and leads to the securing elements being released from the cockpit door.

Further, the displacement element may for example be in the form of an L-shaped or V-shaped rigid component, the first end of which is fastened directly to the securing element and the second end of which is fastened directly to the actuation element or actuation surface. Further, the displacement element may be mounted at the support structure, for example on a bend in the component, so as to be rotatable about a shaft. By moving the actuation surface, the component may be set in rotation about the shaft, and this leads to the securing element which is fastened to the first end being pulled out. This type of configuration of the displacement elements may, for example, be used in combination with a beam-shaped configuration of the actuation surface.

In accordance with a further exemplary embodiment of the present disclosure, a first spring element is provided on the actuation element. Therein, the spring element is configured so as to lock or retain the actuation element, and thus also the actuation surface, in an initial position until a predetermined force value is exceeded. Therein, the spring force may advantageously be selected or set in such a way as to prevent unintentional actuation of the actuation element, and thus undesired release of the securing elements, for example as a result of a hard landing. The first spring element may, for example, be in the form of a spiral spring.

In accordance with one of various aspects of the present disclosure, an emergency exit flap for a cockpit door is provided. The emergency exit flap comprises a main region and an edge region which encloses the main region. The emergency exit flap further comprises an actuation device as described above. Therein, the support structure of the actuation device is fastened to the main region of the emergency exit flap. The edge region is configured so as to engage with the cockpit door in such a way that the emergency exit flap may only be released from the cockpit door in a predetermined opening direction.

For example, the edge region may project beyond the recess of the cockpit door which is covered by the emergency exit flap. That is to say, the edge region has greater dimensions than the recess. As a result, the emergency exit flap may only be opened or pushed open in the direction in which the edge region overlaps the cockpit door.

In accordance with a further exemplary embodiment of the present disclosure, the emergency exit flap further comprises a retaining element which is arranged at the edge region, and is configured so as to retain the emergency exit flap on the cockpit door in such a way that the emergency exit flap is prevented from rattling against the cockpit door under normal flight conditions.

The retaining element may, for example, be in the form of a hook-and-loop element and/or adhesive element. For example, the retaining element may be in the form of a hook-and-loop tape, such as, what is known as Velcro tape. Therein, the retaining element may be arranged in the region in which the emergency exit flap overlaps a region of the cockpit door. Corresponding retaining elements, such as hook-and-loop elements, may be arranged on the cockpit door. The retaining element may cover the entire edge region. Alternatively, a plurality of separate retaining elements may be provided in the edge region. Therein, normal flight conditions correspond, for example, to a flight without turbulence.

In accordance with a further exemplary embodiment of the present disclosure, the emergency exit flap comprises a second spring element. The second spring element is arranged at the edge region and is configured so as to bias the emergency exit flap against the cockpit door in such a way that the emergency exit flap is prevented from rattling against the cockpit door under normal flight conditions.

The spring element may, for example, be an element which yields under load and returns to the original state after being unloaded. For example, the second spring element may be in the form of a spiral spring. Therein, the second spring element may be arranged between the edge region of the emergency exit flap and the cockpit door. In addition, to prevent a rattling noise, the second spring element may also serve to push the emergency exit flap in the predetermined opening direction once the securing elements have been released.

In accordance with another one of various aspects of the present disclosure, a cockpit door for an aircraft is presented. The cockpit door comprises an emergency exit flap as disclosed above and at least two second receiving elements. Therein, the second receiving elements are configured so as to receive the securing elements of the actuation device. Therein, the actuation device is arranged on one cockpit side of the cockpit door. The cockpit door may be a reinforced door which meets safety and counter-terrorism regulations. The second receiving elements, also referred to as inserts, may be in the form of recesses having an integrated fixing mechanism.

In accordance with another one of various aspects of the present disclosure, an aircraft comprising a cabin and a cockpit is provided. Therein, the cockpit is separated from the cabin by a cockpit door as disclosed above.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
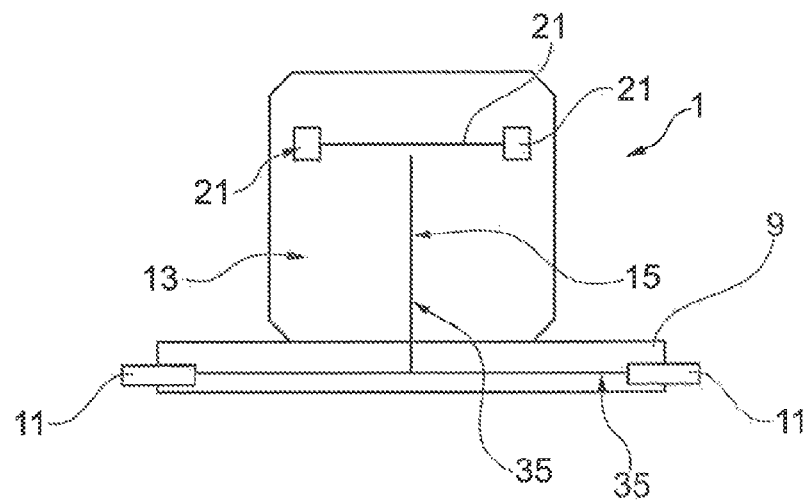
FIG. 1 shows a plan view of an actuation device in accordance with an exemplary embodiment of the present disclosure.

FIG. 1 shows a plan view of an actuation device 1. The actuation device 1 makes it possible to open an emergency exit flap 3 for example by way of a kick. The actuation device 1 comprises a support structure 9 which makes it possible to fasten the actuation device 1 to the emergency exit flap 3. Two securing elements 11 are integrated into the support structure 9, which securing elements 11 fix the actuation device 1 on a cockpit door 5 as shown for example in FIG. 4, and prevent unauthorised opening of the emergency exit flap 3 from the cabin side. The securing elements 11 are, for example, in the form of pins. An actuation element 13 is arranged on the support structure 9, and comprises an actuation surface which is connected to a deflection mechanism 15. The deflection mechanism 15 is configured so as to deflect a force 17, which is exerted on an actuation surface of the actuation element 13, for example, by way of a kick, in such a way that the securing elements 11 are released from the cockpit door 5. This may be seen, for example, from a combination of FIG. 2 and FIG. 4. In this way, the emergency exit flap 3 is unlocked and may be pushed open towards the cabin.

Figure 8:
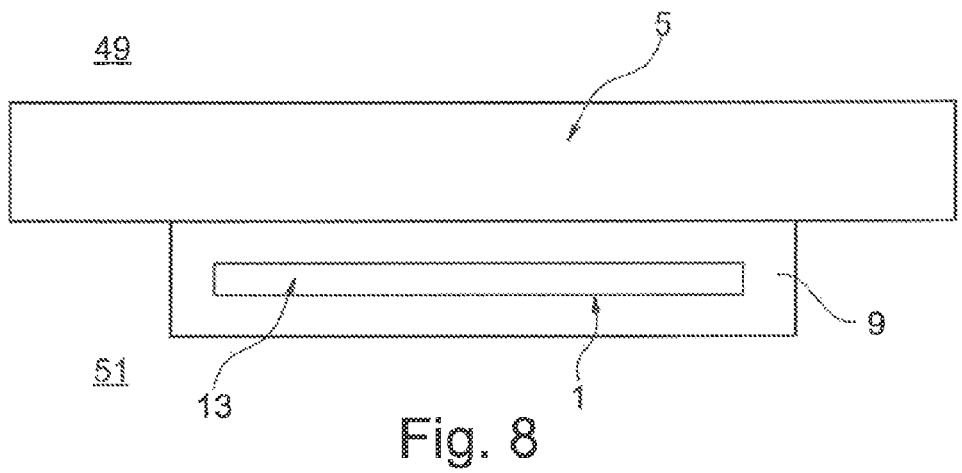
FIG. 8 shows a plan view from above of a cockpit door comprising an alternative embodiment of an actuation device in accordance with a further exemplary embodiment of the present disclosure.
Figure 9:
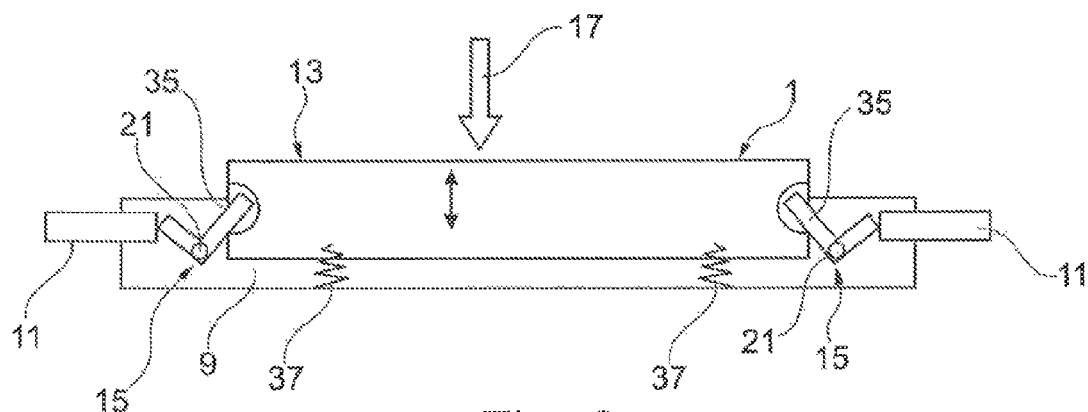
FIG. 9 shows a cross-section through the actuation device shown in FIG. 8.
Figure 10:
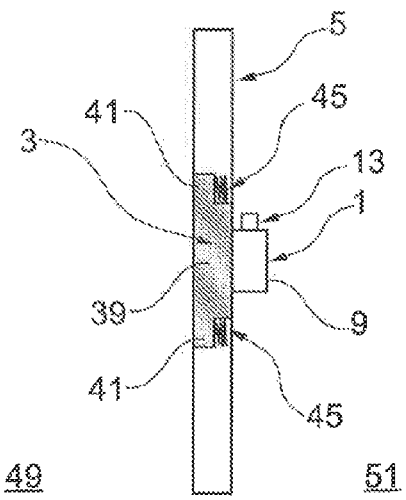
FIG. 10 shows a cross-section through the cockpit door and actuation device, shown in FIG. 8.

Various embodiments are possible for the configuration of the actuation element 13 and the deflection mechanism 15. FIGS. 1 to 4 show an exemplary embodiment in which the actuation surface of the actuation element 13 is at an angle to an emergency exit flap surface 19, and the deflection element 15 comprises a joint element 21 and connecting rods 23, 25. In this exemplary embodiment, a force 17 may be exerted for example in a horizontal direction. FIGS. 8 to 10 show another exemplary embodiment, in which the actuation surface of the actuation element 13 is formed in a beam shape. In this exemplary embodiment, a force 17 which is exerted in the vertical direction may be employed to activate the deflection mechanism 15.

The deflection mechanism 15 comprises a joint element 21, a first connecting rod 23 and a second connecting rod 25. As is shown in FIG. 1, the deflection mechanism 15 may comprise two groups of joint elements 21. A first end 27 of the first connecting rod 23 is connectable to the emergency exit flap 3. That is to say, when the actuation device 1 is arranged on the emergency exit flap 3, the first end 27 is connected directly or indirectly to the emergency exit flap 3. For example, the support structure 9 may comprise a portion (not shown in the drawings) which is parallel to the emergency exit flap 3 and which extends from the securing elements 11 to the joint element 21. Therein, an indirect connection of the first end 27 to the emergency exit flap 3 means that the first end 27 is fastened to this portion of the support structure 9. Therein, the support structure 9 is fastened to the emergency exit flap 3. In this way, the first end 27 of the connecting rod 23 may be indirectly connected to the emergency exit flap 3. A second end 29 of the first connecting rod 23 is connected to the joint element 21 which is in the form of a shaft. Further, a first end 31 of the second connecting rod 25 is also connected to the joint element 21 in such a way that the connecting rods 23, 25 are rotatable about the joint element 21. A second end 33 of the second connecting rod 25 is rigidly, that is to say for example non-releasably, connected to the actuation element 13. Further, the deflection mechanism 15 comprises a displacement element 35 which connects the securing elements 11 to the actuation surface or to the actuation element 13. In the exemplary embodiment in FIG. 2, the displacement element 35 is in the form of a wire rope, of which one end is fastened to the joint element 21 and the respective other ends are fastened to the respective securing elements 11. Therein, the actuation element 13 may comprise a recess or through-hole for the displacement element 35. The displacement element 35 may be connected to the securing elements through the recess.

If a force 17 is now exerted on the actuation surface of the actuation element 13 in a predetermined direction, said surface is pushed towards the emergency exit flap 3. As a result, the connecting rods 23, 25 rotate about the joint element 21. This leads to the joint element 21 being moved upwards. This is shown by a dashed arrow in FIG. 2. The upward movement of the joint element 21 exerts a tensile force on the displacement element 35, which releases the securing elements 11 from second receiving elements 48 in the cockpit door 5 and pulls them into the support structure 9. In this way, the emergency exit flap 3 is unlocked and may be opened generally towards the cabin.

In this way, the emergency exit flap 3 is made safer and simpler to open as a result of a mechanical deflection of the forces. For example, as a result of the actuation device 1 the emergency exit flap 3 may be unlocked from the cockpit door 5 merely by way of a kick and opened or removed towards the cabin. In this way, an evacuation opening which is sealed by the emergency exit flap 3 may be released in a rapid and safe manner. With the actuation device 1 according to the present disclosure, manual removal of pins by pulling on rings becomes unnecessary, and the operation of the opening mechanism becomes more intuitive.

Figures 2, 3:
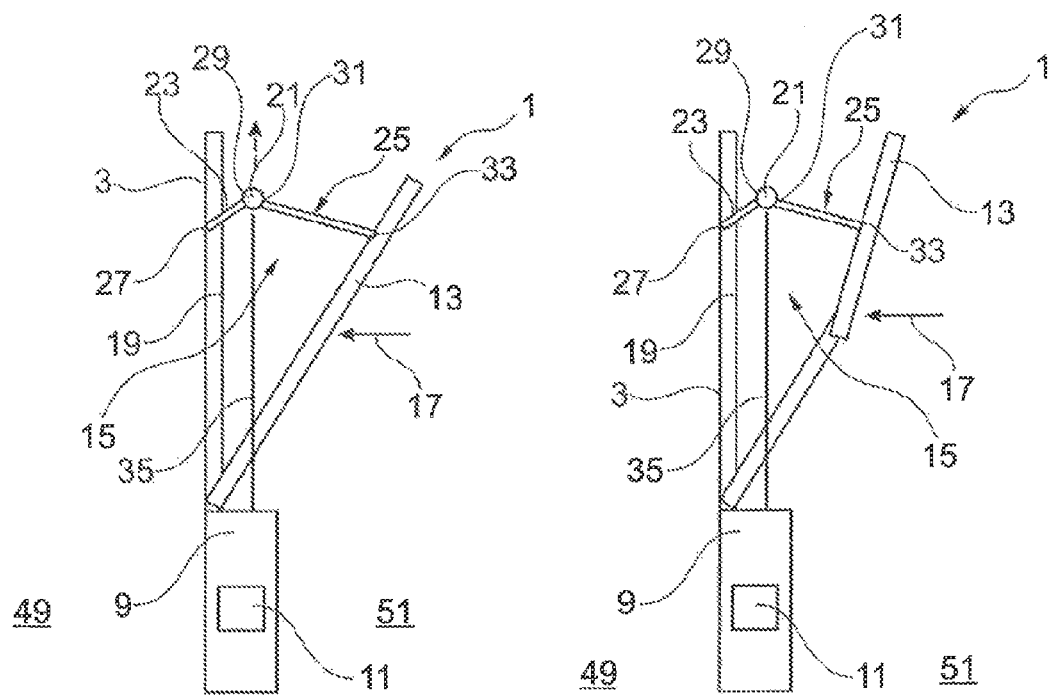
FIG. 2 shows a cross-section through the actuation device shown in FIG. 1.
FIG. 3 shows a cross-section through an actuation device in accordance with another exemplary embodiment of the present disclosure.

FIG. 3 shows a configuration of the actuation device similar to that in FIG. 2. Unlike in FIG. 2, the actuation element 13 in FIG. 3 is in the form of a three-dimensional structure rather than a plane. The actuation element 13 in FIG. 3 comprises two planes which are arranged at an angle to one another. This may for example optimise the deflection of the force 17, and the actuation element is more easily accessible ergonomically (for stepping on).

Figure 4:
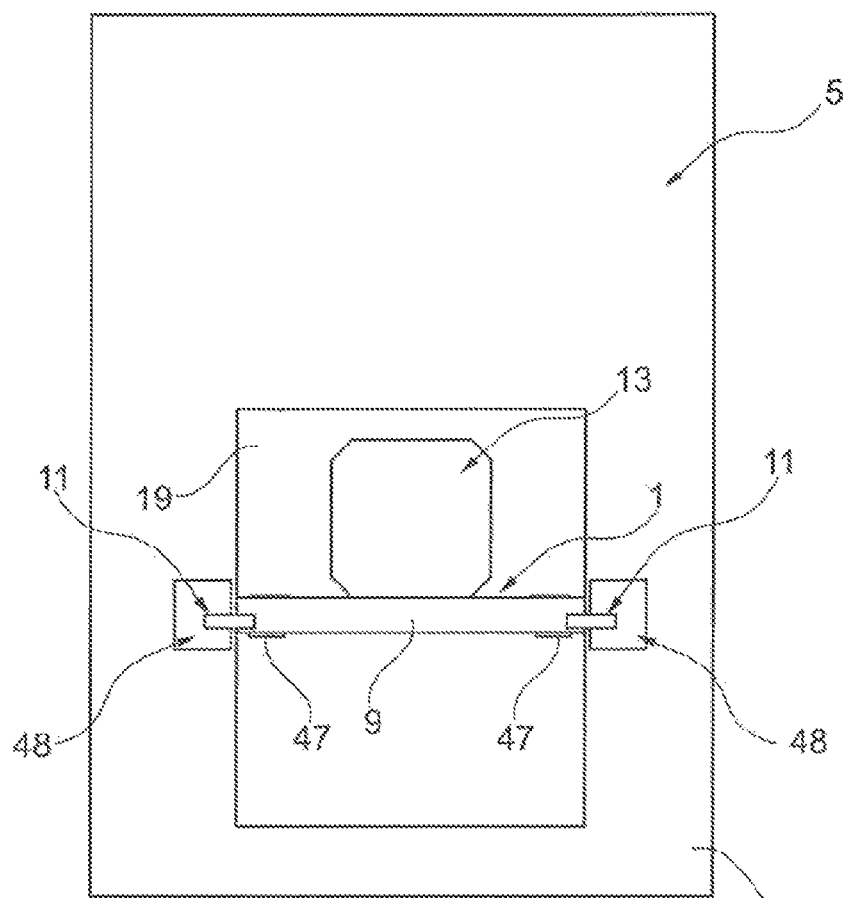
FIG. 4 shows a plan view, from the cockpit side, of a cockpit door comprising an emergency exit flap and an actuation device in accordance with an exemplary embodiment of the present disclosure.
Figure 5:
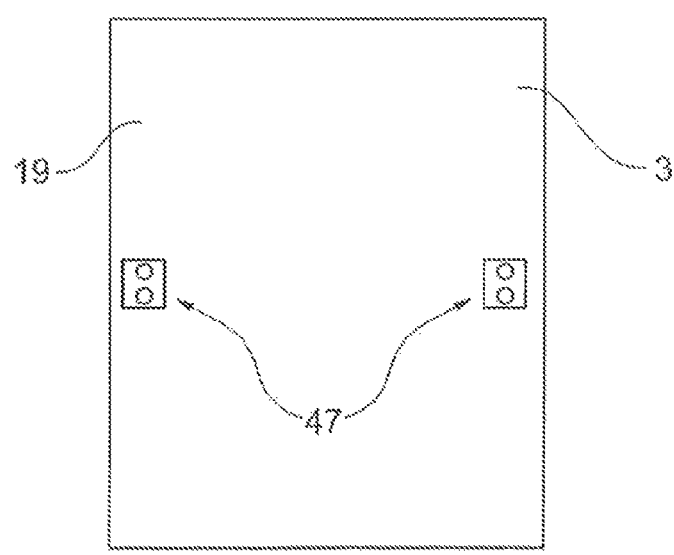
FIG. 5 shows a plan view, from the cockpit side, of an emergency exit flap in accordance with an exemplary embodiment of the present disclosure.

FIG. 4 shows the arrangement of the emergency exit flap 3 comprising the actuation device 1 on a cockpit door 5 as viewed from the cockpit side. The cockpit door 5 is in the form of a reinforced cockpit door 5 and comprises two receiving elements 48, which fix the securing elements 11 of the actuation device 1 and thus lock the emergency exit flap 3. The support structure 9 of the actuation device 1 is further fastened to first receiving elements 47 on the emergency exit flap 3, which are provided for this purpose. This fastening is maintained even when the emergency exit flap 3 is opened. FIG. 5 merely shows the emergency exit flap 3 without the actuation device 1, as viewed from the cockpit 51.

Figure 6:
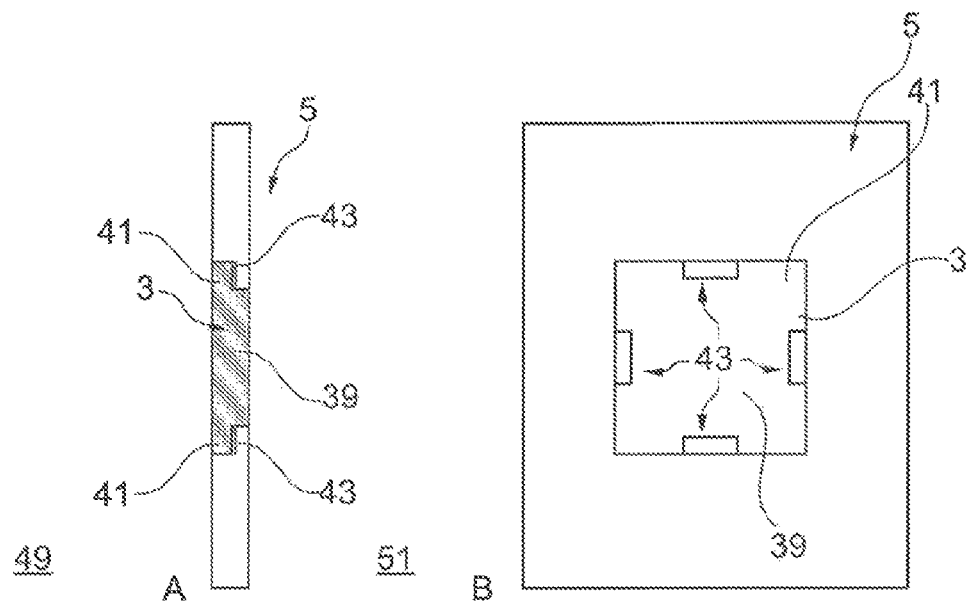
FIG. 6 shows various cross-sections through a cockpit door in accordance with further exemplary embodiments of the present disclosure.

In FIG. 6A a cross-section through the cockpit door 5 comprising the emergency exit flap 3 along a plane parallel to the floor or to the horizontal is shown. Therein, the cabin 49 is to the left and the cockpit 51 is to the right of the cockpit door 5. The emergency exit flap 3 comprises a main region 39 and an edge region 41. The actuation device 1 may be arranged in the main region 39, as is shown in FIG. 4 and FIG. 10. The edge region 41 may be configured so as to extend around the main region 39 and comprise a step relative to the main region 39. Further, the main region 39 may be rigidly coupled to the edge region 41. Thus, for example, the two regions may be formed integrally. The cockpit door 5 comprises a corresponding step in the evacuation opening. As a result of this step, the edge region 41 can engage with the cockpit door 5 in such a way that the emergency exit flap 3 may only be opened in a predetermined direction, specifically towards the cabin 49 (that is to say to the left in FIG. 6A).

In FIG. 6B a cross-section of the cockpit door 5 along a plane perpendicular to the floor or parallel to a vertical cockpit door surface is shown. Therein, the emergency exit flap 3 comprises four retaining elements 43 in the edge region 41. For example, the retaining elements 43 may be arranged on the step of the cockpit door 5 as well as on the edge region 41. The retaining elements 43 may, for example, be in the form of a hook-and-loop tape or an adhesive tape or film. The retaining elements 43 may be made easy to release, and serve to prevent undesired noise, such as rattling noises between the emergency exit flap and the cockpit door 5. By stepping on the actuation device, the securing elements 11 may be unlocked, the retaining elements 43 may be released, and the emergency exit flap 3 may be opened simultaneously.

Figure 7:
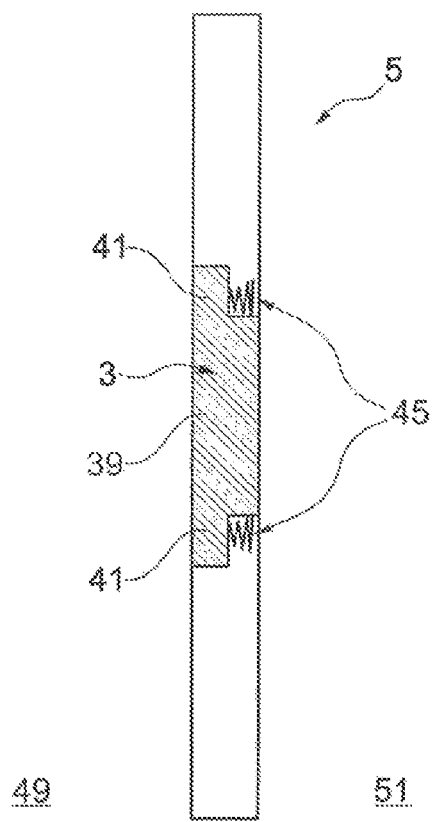
FIG. 7 shows a cross-section through a cockpit door comprising second spring elements which are arranged on the emergency flap in accordance with a further exemplary embodiment of the present disclosure.

In FIG. 7 a cross-section of the cockpit door 5 from the same perspective as in FIG. 6A is shown. Instead of the retaining elements 43, two second spring elements 45 are provided on the edge region 41 of the emergency exit flap 3. The second spring elements 45 bias the emergency exit flap 3 against the cockpit door 5, whilst the securing elements 11 of the actuation device 1 retain the emergency exit flap 3 on the cockpit door 5. The second spring elements 45 prevent the emergency exit flap 3 from rattling against the cockpit door 5, and actively push the emergency exit flap 3 towards the cabin once the securing elements 11 have been released from the second receiving elements 48. As a result, the force 17 necessary for opening the emergency exit flap 3 may be reduced.

In FIG. 8 an exemplary embodiment of the actuation device 1 comprising a beam-shaped actuation element 13 is shown. Therein, FIG. 8 shows a plan view from above of the cockpit door 5 with the actuation device 1 arranged thereon. In FIG. 8, the cabin 49 is at the top and the cockpit 51 is at the bottom. Therein, the actuation surface of the actuation element 13 is orientated parallel to the floor or perpendicular to the cockpit door surface. When a force is exerted on the actuation surface, it is displaced parallel to the floor or to the horizontal.

In FIG. 9 a cross-section through the actuation device 1 shown in FIG. 8, which cross-section is parallel to a vertical or the cockpit door 5 is shown. Therein, the movement direction of the actuation element 13 is shown by an arrow. For example, the actuation surface may be actuated by a step from above in the vertical direction. The actuation element 13 is connected to the securing elements 11 via two L-shaped displacement elements 35. When the actuation element 13 is displaced from the resting position thereof, the displacement elements 35 rotate about joint elements 21 and release the securing elements 11 from the cockpit door 5. Therein, the actuation element 13 is retained or locked in the initial position thereof by first spring elements 37. Therein, the spring force of the first spring elements 37 is selected in such a way that movement of the actuation surface 13 is only made possible when a predetermined force is exceeded. This prevents undesired unlocking of the securing elements 11, for example as a result of a hard landing.

In FIG. 10 a cross-section through the cockpit door 5 shown in FIG. 8, comprising the actuation device 1 parallel to the vertical or parallel to the cockpit door 5 is shown. Therein, similarly to the exemplary embodiment in FIG. 7, second spring elements 45 for preventing a rattling noise are provided on the edge region 41 of the emergency exit flap 3. The spring elements 45 engage on the emergency exit flap 3 on one side. On the other side, the spring elements 45 may engage on a step of the evacuation opening in the cockpit door 5. This is shown schematically in FIG. 10.

Figure 11:
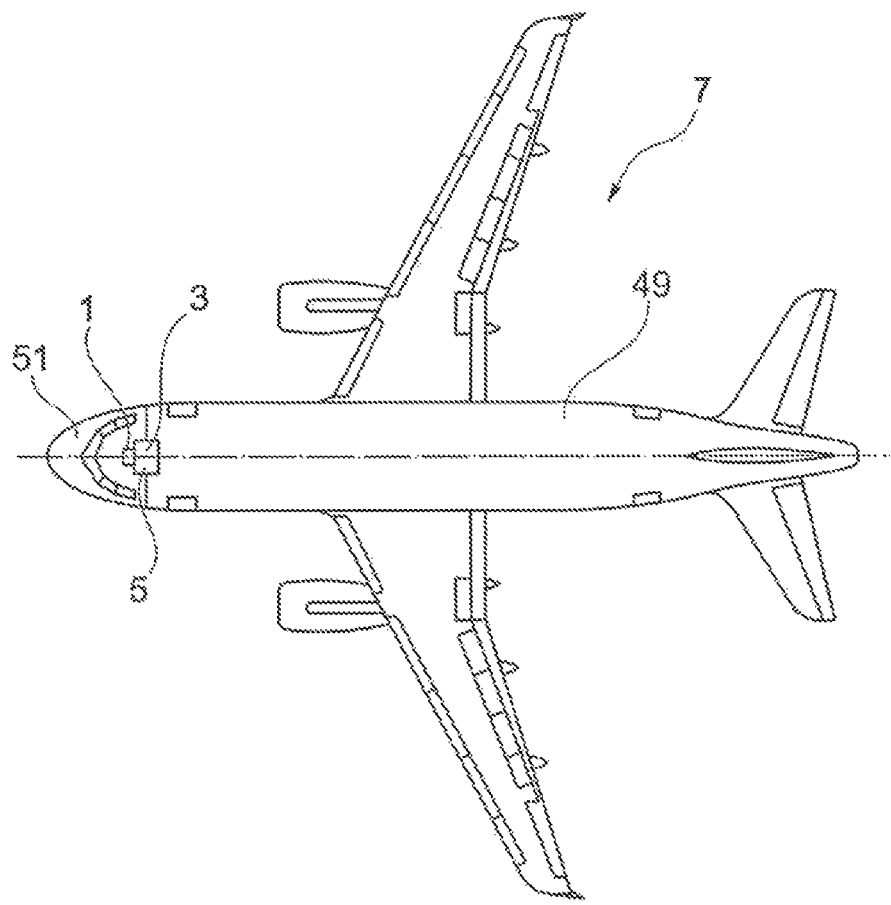
FIG. 11 shows an aircraft comprising a cockpit door and an actuation device arranged thereon in accordance with an exemplary embodiment of the present disclosure.

FIG. 11 shows an aircraft 7 comprising a cabin 49 and a cockpit 51. The cockpit 51 is separated from the cabin 49 by a reinforced cockpit door 5. An emergency exit flap 3 is provided in the cockpit door 5. The emergency exit flap 3 is locked to the cockpit door by way of securing elements 11 and may be opened in a rapid and simple manner by the actuation device 1.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. An actuation device for opening an emergency exit flap of a cockpit door, comprising:
   a support structure which is fastenable to the emergency exit flap;
   at least two securing elements which are integrated into the support structure and are configured so as to fasten the actuation device and the emergency exit flap to the cockpit door;
   an actuation element which is connected to the support structure such that the actuation element is movable towards the emergency exit flap when the support structure is fastened to the emergency exit flap, wherein the actuation element comprises a recess or through hole;
   a deflection mechanism which connects the securing elements to the actuation element so that a force, which is exerted on the actuation element, is diverted so that the securing elements are released from the cockpit door, wherein the deflection mechanism further comprises a displacement element that connects the securing elements to the actuation element, and wherein the displacement element pulls the securing elements into the support structure when the force is exerted on the actuation element, and wherein the displacement element is connected to the securing elements through the recess or through hole in the actuation element;
   wherein the actuation element is designed as a kicking surface that is at an acute angle to an emergency exit flap surface when the support structure is fastened to the emergency exit flap and no force is exerted on the kicking surface and the actuation element is connected to the support structure in such a way that the angle becomes smaller when the kicking surface is pushed towards the emergency exit flap due to exertion of the force on the kicking surface and the deflection mechanism is actuated as a result.

2. The actuation device according to claim 1, wherein the deflection mechanism further comprises: a first joint element, a first connecting rod and a second connecting rod.

3. The actuation device according to claim 2, wherein the first connecting rod and second connecting rod each include a first end and a second end, with the first end of the first connecting rod connectable to the emergency exit flap and the second end of the second connecting rod connectable to the actuation element.

4. The actuation device according to claim 3, wherein the second end of the first connecting rod and the first end of the second connecting rod are rotatably connected by the first joint element and wherein the force which is exerted on the actuation element is converted into a rotational movement of the first connecting rod and the second connecting rod about the joint element.

5. The actuation device according to claim 4, wherein the rotational movement of the first connecting rod and the second connecting rod leads to the securing elements being released from the cockpit door.

6. The actuation device according to claim 1, wherein a first spring element is provided on the actuation element and wherein the first spring element blocks the actuation element in an initial position until a predetermined force is exceeded.

* * * * *